(12) United States Patent
Nakagawa et al.

(10) Patent No.: US 6,770,253 B2
(45) Date of Patent: Aug. 3, 2004

(54) PROCESS FOR PRODUCING SILICON TETRAFLUORIDE

(75) Inventors: Shinsuke Nakagawa, Yamaguchi (JP); Takaaki Shibayama, Yamaguchi (JP); Atsushi Ryokawa, Yamaguchi (JP); Hisakazu Itoh, Yamaguchi (JP)

(73) Assignee: Central Glass Company, Limited, Yamaguchi (JP)

( * ) Notice: Subject to any disclaimer, the term of this patent is extended or adjusted under 35 U.S.C. 154(b) by 0 days.

(21) Appl. No.: 10/238,041

(22) Filed: Sep. 10, 2002

(65) Prior Publication Data

US 2003/0095909 A1 May 22, 2003

(30) Foreign Application Priority Data

Sep. 11, 2001 (JP) ......................................... 2001-274405
Jun. 6, 2002 (JP) ......................................... 2002-165076

(51) Int. Cl.$^7$ ............................................. C01B 33/08
(52) U.S. Cl. ...................... 423/341; 423/342; 423/489; 423/344; 423/240 S
(58) Field of Search ................................ 423/341, 342, 423/344, 489, 240 R, 240 S

(56) References Cited

U.S. PATENT DOCUMENTS

| | | | | | |
|---|---|---|---|---|---|
| 3,674,431 A | * | 7/1972 | Driscoll et al. | ............. | 423/341 |
| 3,754,077 A | * | 8/1973 | Kruger et al. | ............... | 423/341 |
| 4,382,071 A | * | 5/1983 | Otsuka et al. | ............... | 423/341 |
| 4,615,872 A | * | 10/1986 | Porcham | ..................... | 423/341 |

FOREIGN PATENT DOCUMENTS

| | | |
|---|---|---|
| JP | A-57-17414 | 1/1982 |
| JP | A-63-74910 | 4/1988 |
| JP | A-7-81903 | 3/1995 |

* cited by examiner

*Primary Examiner*—Ngoc-Yen Nguyen
(74) *Attorney, Agent, or Firm*—Crowell & Moring LLP

(57) ABSTRACT

A process for producing silicon tetrafluoride includes reacting at 250° C. or higher elemental silicon with hydrogen fluoride, thereby producing a gas product containing silicon tetrafluoride. This reaction can be conducted such that the gas product contains at least 0.02 volume % of the unreacted hydrogen fluoride. The process may further include bringing the gas product into contact with elemental nickel at a temperature of 600° C. or higher. Alternatively, the process may further include adding at least 0.1 volume % of hydrogen fluoride to the gas product to prepare a gas mixture; and bringing the gas mixture into contact with elemental nickel at a temperature of 400° C. or higher.

10 Claims, No Drawings

PROCESS FOR PRODUCING SILICON TETRAFLUORIDE

BACKGROUND OF THE INVENTION

The present invention relates to a process for producing silicon tetrafluoride of high purity, which is used in the fields of electronics, optics and the like.

Silicon tetrafluoride ($SiF_4$) is used, for example, as a fluorine-doping agent of quartz-based optical fibers, as a raw material of photomask materials for semiconductor lithography, and as a chemical vapor deposition gas for producing semiconductors. Silicon tetrafluoride has increasingly been used in recent years. Therefore, there is a demand for more efficient techniques for producing silicon tetrafluoride of high purity.

There are several conventional processes for producing silicon tetrafluoride, as follows. Japanese Patent Unexamined Publication JP-A-63-74910 discloses a first process for producing silicon tetrafluoride by pyrolyzing a metal silicofluoride (e.g., sodium silicofluoride). Japanese Patent Unexamined Publication JP-A-57-17414 discloses a second process for producing silicon tetrafluoride by introducing hydrogen fluoride gas into a system where amorphous silicon dioxide has been dispersed in sulfuric acid. Japanese Patent Unexamined Publication JP-A-7-81903 discloses a third process for producing silicon tetrafluoride by reacting fluorine with a mixture of calcium fluoride and silicon powder at 140° C. Of these processes, the third process is superior to the first and second processes with respect to reducing the amount of industrial wastes. In fact, the third process does almost not generate wastes. In contrast, the first and second processes respectively generate large amounts of a metal fluoride (e.g. sodium fluoride) and sulfuric acid as industrial wastes. Prior to conducting the third process, it is necessary to produce fluorine by electrolyzing hydrogen fluoride. Due to this, the third process is disadvantageous in terms of reducing production cost and energy consumption.

SUMMARY OF THE INVENTION

It is an object of the present invention to provide a process for economically producing silicon tetrafluoride of high purity.

According to the present invention, there is provided a process for producing silicon tetrafluoride. This process comprises the step of (a) reacting at a temperature of 250° C. or higher elemental silicon in the form of solid with hydrogen fluoride in the form of gas, thereby producing a gas product comprising the silicon tetrafluoride

DESCRIPTION OF THE PREFERRED EMBODIMENTS

In course of achieving the present invention, the present inventors have studied the use of hydrogen fluoride, which is superior to fluorine, as the fluorine source in producing silicon tetrafluoride from silicon. In fact, hydrogen fluoride is superior to fluorine by the following points. Firstly, hydrogen fluoride itself is a raw material for producing fluorine by electrolysis. Therefore, the use of hydrogen fluoride is naturally lower than that of fluorine in cost. Secondly, hydrogen fluoride is lower than fluorine in chemical potential. Therefore, a reaction of hydrogen fluoride with silicon is considered to generate a less heat than that of a reaction of fluorine with silicon. Thus, it is easier to conduct a thermal control of the former reaction as compared with the latter reaction. Thirdly, hydrogen fluoride has a boiling point of 20° C., thereby making it possible to store hydrogen fluoride in the form of liquid under normal temperature below its boiling point. In contrast, fluorine is in the form of gas under normal temperature. Therefore, the handling of hydrogen fluoride is much easier than that of fluorine.

In reacting silicon with hydrogen fluoride, it can be understood in theory that any of the following three reactions (1)–(3) can occur since ΔG of each reaction has a negative value.

Si (solid)+4HF (gas)→$SiF_4$ (gas)+$2H_2$ (gas)           (1)

Si (solid)+3HF (gas)→$SiHF_3$ (gas)+$H_2$ (gas)           (2)

Si (solid)+2HF (gas)→$SiH_2F_2$ (gas)           (3)

The present inventors, however, unexpectedly found that, when silicon in the form of solid is actually reacted with gaseous hydrogen fluoride, the above reaction (1) occurs dominantly, thereby efficiently producing silicon tetrafluoride.

Although the above reaction (1) does almost not occur at a temperature around room temperature, it does occur as the temperature increases. In fact, the reaction rate increases rapidly as it passes about 250° C. The reaction rate further increases as the temperature increases further. The inventors found that the above reaction (1) occurs dominantly in a temperature range of from 300° C. to a temperature higher than 1,000° C. by directly reacting silicon with hydrogen fluoride gas.

By a further detailed examination on the reaction between silicon and hydrogen fluoride, the inventors found that the above reaction (2) also occurs in some cases, although the reaction (1) is a dominant reaction. In these cases, the gas product naturally contains $SiHF_3$. As the reaction (1) proceeds, $H_2$ is formed as a by-product in an amount two times that of $SiF_4$ in molar number, thereby making the reaction system under a strongly reduced atmosphere. The inventors assumed that $SiHF_3$ would be formed when the amount of HF is insufficient under the $H_2$ atmosphere. Thus, the inventors have tried to suppress the formation of $SiHF_3$ by leaving a part of HF (the unreacted HF) in the resulting gas product. With this, the inventors unexpectedly found that $SiHF_3$ is not formed when the gas product contains HF in an amount of at least 0.02 volume %, preferably at least 0.05 volume %. In other words, according to a first process of a first aspect of the present invention, the reaction is conducted in a manner that the gas product contains at least 0.02 volume % of the unreacted HF, in order to produce silicon tetrafluoride of high purity. Although the upper limit of the HF content of the gas product is not particularly limited, it is preferably 1 volume % or lower in order to conduct a post-treatment for removing HF in an economical way.

In order to control the HF concentration of the gas product in accordance with the first aspect of the present invention, it is preferable to use a so-called perfect mixing type reactor. With this, it becomes possible to obtain a uniform composition of the gas phase through a compulsory stirring of the inside of the reactor. In fact, a large amount of HF gas always exists around Si particles when the gas phase of the reactor is under a perfectly mixed condition. With this, the gas phase HF concentration is less influenced, even if the flow rate of HF gas supplied to the reactor or the reaction temperature fluctuates by certain degrees.

When the gas product contains HF in an amount of 0.02 volume % or higher, such HF can be removed from the gas product by a post-treatment. This removal can be conducted by a purification of the gas product. It is possible to conduct such post-treatment, for example, by bringing the gas product (containing HF) into contact with NaF (in the form of pellets), thereby fixing HF in the form of NaF.HF. It is possible to conduct the post-treatment in an economical way, if the HF concentration of the gas product is in a range of 0.02–1 volume % or 0.05–1 volume %.

When the gas product contains no HF or a very small amount of HF, the gas product may contain $SiHF_3$ as a by-product. The $SiHF_3$ concentration of the gas product becomes higher as the HF concentration of the gas product becomes lower. For example, when the gas product contains no HF, the $SiHF_3$ concentration may reach about 1 volume %. Such condition can be obtained, for example, by conducting a reaction in a manner that HF gas is introduced in a so-called piston flow manner into one end of a cylindrical reactor charged with silicon. In fact, the HF gas introduced into the reactor is consumed by the reaction with silicon as it passes through a fixed bed of Si. Therefore, the HF concentration of the gas phase becomes zero as the HF gas introduced in a piston flow manner reaches the exit of the reactor, provided that silicon exists in a sufficient amount relative to that of the introduced HF gas.

The above-mentioned $SiHF_3$, which may be contained as a by-product in the gas product, is thermally unstable as compared with silicon tetrafluoride. Therefore, it is possible to conduct a disproportionation of $SiHF_3$ into Si and $SiF_4$ by heating the gas product obtained at the exit of the reactor, as shown by the following reaction formula (4).

$$4SiHF_3 \rightarrow Si + 3SiF_4 + 2H_2 \qquad (4)$$

The inventors found that this disproportionation does not proceed well only by heating the gas product. As a result of an elaborate examination on the conditions for allowing the reaction (4) to proceed in the right direction, the inventors unexpectedly found that it is effective to treat the gas product (containing $SiHF_3$) with a heated elemental (metallic) nickel. In fact, we unexpectedly found that the above disproportionation occurs easily and selectively by bringing the gas product (containing $SiHF_3$) into contact with elemental nickel at a temperature of 600° C. or higher. This is a second process according to a second aspect of the present invention. After its use for this disproportionation, the surface of nickel was found to have a nickel suicide represented by $Ni_{31}Si_{12}$. In case that nickel exists in the reaction system, silicon formed by the disproportionation reacts with Ni. The resulting $Ni_{31}Si_{12}$ is separated from the reaction system (gas phase), thereby losing the chemical equilibrium of the reaction in a manner to allow the reaction to proceed in the right direction. The nickel filler used in the disproportionation may take an arbitrary shape. It is, however, preferable to take measures to make the nickel have a large surface area capable of its sufficient contact with the gas product.

As stated above, the above disproportionation is conducted, when the gas product contains no HF or a very small amount of HF, in order to remove $SiHF_3$ from the gas product. Therefore, the gas product after completing the disproportionation is substantially free from impurities (e.g., HF and $SiHF_3$). Thus, it is not necessary to conduct a purification for removing HF (e.g., by using NaF), since the gas product is already substantially free of HF.

As an alternative to the above disproportionation, the inventors unexpectedly found that, when the gas product (obtained by the reaction between Si and HF) contains $SiHF_3$ as a by-product and is substantially free of hydrogen fluoride, it is possible to remove $SiHF_3$ by a third process according to a third aspect of the present invention. The third process comprises the steps of:

adding at least 0.1 volume % of hydrogen fluoride to the gas product, thereby preparing a gas mixture containing $SiHF_3$ and the hydrogen fluoride; and bringing the gas mixture into contact with elemental nickel at a temperature of 400° C. or higher, thereby reacting the $SiHF_3$ with the hydrogen fluoride to produce silicon tetrafluoride, as shown by the following reaction formula (5).

$$SiHF_3 + HF \xrightarrow{(Ni)} SiF_4 + H_2 \qquad (5)$$

As mentioned above, it is possible to obtain the gas product, which contains $SiHF_3$ as a by-product and is substantially free of HF, for example, by introducing HF into one end of the cylindrical reactor (charged with silicon) by a piston flow manner. In the third process, it is preferable to add hydrogen fluoride in an amount of 0.1–1 volume %.

In the third process, it is important to appropriately control the HF concentration of the reaction system in order to completely turn $SiHF_3$ into $SiF_4$. It is, however, easy to adjust the HF concentration in the third process. In fact, it is more easily possible in the third process to maintain the HF concentration at a constant level, since HF with a constant flow rate is added to the gas product substantially free of HF, as compared with the first process in which the HF concentration is indirectly adjusted by the amount of the unreacted HF remaining in the gas product. In the third process, the nickel filler does not turn into a nickel silicide, but is maintained in its metallic or elemental form. Furthermore, the temperature for conducting the reaction (5) can be substantially lower than that for conducting the reaction (4). In order to completely turn $SiHF_3$ into $SiF_4$ in the third process, it is necessary to add HF in an amount equimolar with that of $SiHF_3$ or greater. Similar to the first process, it is necessary to remove HF, if it remains in the system after the reaction (5).

By eagerly examining the third process, the inventors unexpectedly found that it is possible to remove other four impurities (i.e., $SiF_3CH_3$, $C_2H_6$, $C_2H_4$ and $(SiF_3)_2O$) together with $SiHF_3$ by conducting the third process. Of these four impurities, the carbon-containing components (i.e., $SiF_3CH_3$, $C_2H_6$ and $C_2H_4$) originate from carbon contained as an impurity in silicon as the raw material. It may be difficult to separate these carbon-containing components from $SiF_4$ by other conventional measures except the third process. For example, it is difficult to separate the carbon-containing components from $SiF_4$ by using vapor pressure difference therebetween, since the carbon-containing components (i.e., $SiF_3CH_3$, $C_2H_6$ and $C_2H_4$) respectively have boiling points of −30.2° C., −88.63° C. and −103.71° C., which are too high relative to that (−95.7° C.) of $SiF_4$. Furthermore, it is almost impossible to remove the carbon-containing components by using an adsorbent such as zeolite and activated carbon. In producing silicon tetrafluoride, it is inevitable to have the above-mentioned carbon-containing impurities in an elemental silicon of relatively low price. As mentioned above, the carbon-containing components are unexpectedly removed in the presence of elemental nickel by conducting the third process, as shown by the following reaction formulas (6), (7) and (8).

$$SiF_3CH_3 + HF \rightarrow SiF_4 + CH_4 \qquad (6)$$

$$C_2H_6 + H_2 \rightarrow 2CH_4 \qquad (7)$$

$$C_2H_4 + 2H_2 \rightarrow 2CH_4 \qquad (8)$$

It is understood from the reaction formulas (6)–(8) that the final products of these reactions are $SiF_4$ and $CH_4$. Although the reactions (7) and (8) do not require HF, the existence of HF does not interfere with these reactions. It is easily possible to separate $CH_4$ (boiling point: −191.5° C.) together with other low-boiling-point components (e.g., $H_2$, $O_2$ and $N_2$) from $SiH_4$ (boiling point: −95.7° C.) by vacuum evacuation, since $CH_4$ has a high vapor pressure sufficient for being distributed to the gas phase even at a temperature at which $SiF_4$ liquefies or solidifies.

The above-mentioned fourth impurity $(SiF_3)_2O$ is generated by water or oxides adsorbed to the raw materials and the reaction vessel and is difficult to be removed. However, this impurity can also be removed by conducting the third process, as shown by the following reaction formula (9).

$$(SiF_3)_2O + 2HF \rightarrow 2SiF_4 + H_2O \qquad (9)$$

It is possible to remove $H_2O$, which is generated by the reaction (9), by using a dehydrating agent such as concentrated sulfuric acid or zeolite.

Thus, as shown by the reaction formulas (5)–(9), the impurities (i.e., $SiHF_3$, $SiF_3CH_3$, $C_2H_6$, $C_2H_4$, and $(SiF_3)_2O$), which may be contained in the gas product obtained by the reaction between silicon and hydrogen fluoride, can turn into $SiF_4$, $CH_4$ and $H_2O$ by heating at a temperature of 400° C. or higher in the presence of HF, $H_2$ and Ni. Then, it is possible to obtain $SiF_4$ of high purity by separating $CH_4$, $H_2O$ and $H_2$.

The following nonlimitative Examples are illustrative of the present invention.

COMPARATIVE EXAMPLE 1

Silicon (purity: 98%), which is used as a raw material for semiconductor high purity silicon, was ground to have a particle size of 5–15 mm. The resulting silicon particles in an amount of about 1 kg were put on shelves of a horizontal reactor. This reactor was formed with the shelves for putting a reactant at its middle portion of a horizontal nickel cylinder (inner diameter: 200 mm; axial length: 500 mm). The reactor was further formed with two lids for closing the nickel cylinder at its both ends. One lid was formed with a gas supplying pipe, a gas exhausting pipe, and a blade for compulsorily stirring the gas of the inside space of the reactor. This blade was sealingly connected with an outside motor for driving the blade. Furthermore, the reactor was formed at its periphery with an electrical heater for heating the reactor at a predetermined temperature.

As shown in Table 1, the reaction between Si and HF gas was conducted continuously at 200° C. by allowing HF gas to flow at a flow rate of 1.6 Nl/min through the reactor, while the inside gas was uniformly stirred by rotating the blade. The gas product was exhausted from the gas exhausting pipe in a manner to maintain the inside pressure at atmospheric pressure and then was analyzed with gas chromatography and FT-IR (Fourier Transform Infrared Analysis). With this, it was found that $SiF_4$ was not detected (ND), that HF was 100 volume %, and that $SiHF_3$ was lower than 2 volume ppm (2>), as shown in Table 1.

EXAMPLES 1–9

In these examples, Comparative Example 1 was repeated except in that the HF flow rate and the reaction temperature were changed as shown in Table 1. The HF concentrations of only Examples 4–7 are expressed in volume ppm in Table 1.

TABLE 1

| | HF Flow Rate (Nl/min) | Reaction Temp. (° C.) | Gas Product Composition/$H_2$ balance | | |
|---|---|---|---|---|---|
| | | | $SiF_4$ (vol. %) | HF (vol. %) *(vol. ppm) | $SiHF_3$ (vol. ppm) |
| Com. Ex. 1 | 1.6 | 200 | ND | 100 | 2> |
| Ex. 1 | 1.6 | 300 | 5.8 | 83 | 2> |
| Ex. 2 | 1.6 | 400 | 22 | 35 | 2> |
| Ex. 3 | 1.6 | 500 | 24 | 27 | 2> |
| Ex. 4 | 0.32 | 500 | 33 | *9,310 | 2> |
| Ex. 5 | 0.23 | 500 | 33 | *1,200 | 2> |
| Ex. 6 | 0.20 | 500 | 33 | *400 | 5 |
| Ex. 7 | 0.18 | 500 | 33 | *170 | 150 |
| Ex. 8 | 1.6 | 600 | 25 | 24 | 2> |
| Ex. 9 | 4 | 500 | 22 | 34 | 2> |

COMPARATIVE EXAMPLE 2

A cylindrical vertical-type reactor was charged with 1.5 kg of Si particles that were the same as those of Comparative Example 1. This reactor had a nickel cylindrical body (inner diameter: 80 mm; height: 500 mm), a roof plate equipped with a nozzle for supplying HF, and a bottom plate equipped with a nozzle for exhausting the reaction gas. Furthermore, the reactor was formed at its periphery with an electrical heater for making the reactor have a predetermined temperature. As shown in Table 2, the reaction was conducted at 200° C., while HF gas was allowed to flow downwardly at a flow rate of 1.6 Nl/min through a silicon fixed bed of the reactor in a piston flow manner. The gas product was exhausted from the gas exhausting nozzle in a manner to maintain the inside pressure at atmospheric pressure and then was analyzed with gas chromatography and FT-IR. The results are shown in Tables 2 and 3.

TABLE 2

| | HF Flow Rate (Nl/min) | Reaction Temp. (° C.) | Gas Product Composition/$H_2$ balance | | |
|---|---|---|---|---|---|
| | | | $SiF_4$ (vol. %) | HF (vol. %) | $SiHF_3$ (vol. ppm) |
| Com.Ex.2 | 1.6 | 200 | ND | 100 | 2> |
| Com.Ex.3 | 1.6 | 300 | 32 | 2 | 5,400 |
| Com.Ex.4 | 1.6 | 400 | 33 | *ND | 9,200 |
| Com.Ex.5 | 1.6 | 500 | 33 | *ND | 9,700 |
| Com.Ex.6 | 1.6 | 600 | 33 | *ND | 10,400 |
| Com.Ex.7 | 1.6 | 700 | 33 | *ND | 16,000 |
| Com.Ex.8 | 0.2 | 500 | 33 | *ND | 10,000 |
| Com.Ex.9 | 4 | 500 | 33 | *ND | 9,700 |

*ND for HF: an amount lower than 20 volume ppm.

TABLE 3

| | Gas Product Composition/$H_2$ balance (vol. ppm) | | | | |
|---|---|---|---|---|---|
| | $SiF_3CH_3$ | $C_2H_6$ | $C_2H_4$ | $CH_4$ | $(SiF_3)_2O$ |
| Com.Ex.2 | 1> | 0.1> | 0.1> | 0.1> | 5> |
| Com.Ex.3 | 3 | 2 | 0.3 | 4 | 2,000 |
| Com.Ex.4 | 7 | 2 | 0.4 | 6 | 2,600 |
| Com.Ex.5 | 8 | 2 | 0.6 | 15 | 3,000 |
| Com.Ex.6 | 8 | 2 | 0.6 | 22 | 3,800 |
| Com.Ex.7 | 8 | 3 | 0.7 | 31 | 4,600 |
| Com.Ex.8 | 8 | 2 | 0.6 | 12 | 3,000 |
| Com.Ex.9 | 10 | 2 | 0.4 | 20 | 3,000 |

EXAMPLE 10

A first reactor (which was the same as that used in Comparative Example 2) was connected at its gas exhausting line with a cylindrical, horizontal-type, second reactor. The first reactor was provided for conducting the reaction between silicon and hydrogen fluoride. The second reactor was provided for conducting the above-described reaction (5). The second reactor had a horizontal cylindrical body of nickel (inner diameter: 80 mm; axial length: 800 mm) and an electrical heater at its periphery for maintaining the second reactor at a predetermined temperature. The second reactor was provided at its inlet side with (1) a first line for receiving the gas product from the first reactor and (2) a second line for supplying HF gas into the second reactor. The inside of the second reactor was charged with a metallic nickel filler (see Table 4).

The reaction between Si and HF in the first reactor was conducted at 500° C. with a HF flow rate of 1.6 Nl/min. A first gas product ($SiF_4$ gas containing 9,700 ppm of $SiHF_3$) from the first reactor was introduced into the second reactor. Then, the reaction was conducted at 600° C. in the second reactor by bringing the first gas product into contact with the nickel filler of the second reactor, while HF gas was not added to the second reactor (see Table 4). Then, a second gas product from the second reactor was analyzed with gas chromatography and FT-IR. The results are shown in Tables 4 and 5.

EXAMPLES 11–15 & COMPARATIVE EXAMPLES 10–15

In these examples and comparative examples, Example 10 was repeated except that the reaction conditions were modified as shown in Table 4. In fact, the second reactor was not charged with the Ni filler in Comparative Examples 10–12. In Comparative Examples 14–15 and Examples 12–15, HF gas was added to the second reactor at flow rates shown in Table 4.

In Examples 12–15, the second reactor was provided for conducting the above-described reaction (6)–(9).

It is assumed that, although the second reactor according to Comparative Examples 11 and 12 was not charged with the nickel filler, nickel of the cylindrical body contributed toward turning $SiHF_3$ into $SiF_4$ at respective high temperatures (i.e., 740° C. and 800° C.), thereby reducing the $SiHF_3$ concentration of the second gas product, as shown in Table 4.

EXAMPLE 16

The second gas product (containing 33 volume % of $SiF_4$ and 1,000 volume ppm of HF ($H_2$ balance)) obtained in Example 15 was allowed to flow through a column (charged with NaF pellets) of room temperature with a retention time of 120 seconds. The resulting gas product from the column was collected through its liquefaction using a dry ice-ethanol refrigerant under a pressurized condition. The gas phase was purged from the collected liquid, thereby obtaining a high purity $SiF_4$ not containing impurities such as HF, $SiHF_3$, $SiF_3CH_3$, $C_2H_6$, $C_2H_4$, $(SiF_3)_2O$ and $H_2$.

The entire contents of Japanese Patent Application Nos. 2001-274405 filed on Sep. 11, 2001 and 2002–165076 filed on Jun. 6, 2002, of which priorities are claimed in the present application, are incorporated herein by reference.

What is claimed is:

1. A process for producing silicon tetrafluoride, comprising the steps of:

(a) reacting, at a temperature of 250° C. or higher, elemental silicon in solid form with hydrogen fluoride in gas form, thereby producing a gas product comprising silicon tetrafluoride and unreacted hydrogen fluoride; and (b) removing the hydrogen fluoride unreacted in step (a) from the gas product by bringing the gas product into contact with NaF in the form of pellets.

TABLE 4

| | | Reaction | | HF Flow | Second Gas Product Composition/$H_2$ balance | | |
|---|---|---|---|---|---|---|---|
| | Use of Ni Filler | Temp. (° C.) | HF Addition | Rate (Nml/min) | $SiF_4$ (vol. %) | HF (vol. ppm) | $SiHF_3$ (vol. ppm) |
| Com. Ex. 10 | No | 600 | No | — | 33 | 20> | 3,700 |
| Com. Ex. 11 | No | 740 | No | — | 33 | 20> | 50 |
| Com. Ex. 12 | No | 800 | No | — | 33 | 20> | 40 |
| Com. Ex. 13 | Yes | 500 | No | — | 33 | 20> | 9,500 |
| Ex. 10 | Yes | 600 | No | — | 33 | 20> | 2> |
| Ex. 11 | Yes | 700 | No | — | 33 | 20> | 2> |
| Com. Ex. 14 | Yes | 400 | Yes | 6 | 33 | 1,000 | 20 |
| Com. Ex. 15 | Yes | 500 | Yes | 6 | 33 | 300 | 90 |
| Ex. 12 | Yes | 500 | Yes | 21 | 33 | 1,000 | 2> |
| Ex. 13 | Yes | 600 | Yes | 29 | 33 | 1,000 | 2> |
| Ex. 14 | Yes | 600 | Yes | 88 | 33 | 3,000 | 2> |
| Ex. 15 | Yes | 700 | Yes | 32 | 33 | 1,000 | 2> |

TABLE 5

| | Second Gas Product Composition/$H_2$ balance (vol. ppm) | | | | |
|---|---|---|---|---|---|
| | $SiF_3CH_3$ | $C_2H_6$ | $C_2H_4$ | $CH_4$ | $(SiF_3)_2O$ |
| Com. Ex. 10 | 8 | 2 | 0.6 | 15 | 3,000 |
| Com. Ex. 11 | 8 | 2 | 0.6 | 15 | 3,000 |
| Com. Ex. 12 | 8 | 2 | 0.6 | 15 | 3,000 |
| Com. Ex. 13 | 8 | 2 | 0.6 | 15 | 3,000 |
| Ex. 10 | 8 | 0.4 | 0.2 | 18 | 3,000 |
| Ex. 11 | 8 | 0.1> | 0.1> | 19 | 3,000 |
| Com. Ex. 14 | 8 | 2 | 0.6 | 15 | 5> |
| Com. Ex. 15 | 8 | 2 | 0.6 | 15 | 5> |
| Ex. 12 | 8 | 2 | 0.6 | 15 | 5> |
| Ex. 13 | 2 | 0.4 | 0.2 | 18 | 5> |
| Ex. 14 | 1 | 0.4 | 0.2 | 18 | 5> |
| Ex. 15 | 1> | 0.1> | 0.1> | 19 | 5> |

2. A process according to claim 1, wherein step (a) is conducted such that the gas product in step (a) contains at least 0.02 volume % of unreacted hydrogen fluoride.

3. A process according to claim 1, wherein step (a) is conducted such that the gas product in step (a) contains at least 0.05 volume % of unreacted hydrogen fluoride.

4. A process according to claim 1, wherein step (a) is conducted such that the gas product in step (a) contains not greater 1 volume % of unreacted hydrogen fluoride.

5. A process according to claim 1, wherein the temperature of step (a) is 400° C. or higher.

6. A process according to claim 1, wherein a gas phase of step (a) is compulsorily stirred during step (a) to obtain a uniform chemical composition of the gas phase.

7. A process for producing silicon tetrafluoride, comprising the step of (a) reacting, at a temperature of 250° C. or higher, elemental silicon in solid form with hydrogen fluoride in gas form, thereby producing a gas product comprising silicon tetrafluoride, wherein, when the gas product contains $SiHF_3$ as a by-product, the process further comprises the step of (c) bringing the gas product into contact with elemental nickel at a temperature of 600° C. or higher, thereby conducting a conversion of the $SiHF_3$ into silicon tetrafluoride.

8. A process for producing silicon tetrafluoride, comprising the step of (a) reacting, at a temperature of 250° C. or higher, elemental silicon in solid form with hydrogen fluoride in gas form, thereby producing a gas product comprising silicon tetrafluoride, wherein, when the gas product contains $SiHF_3$ as a by-product and is substantially free of hydrogen fluoride, the process of further comprises the steps of:

(d) adding at least 0.1 volume % of hydrogen fluoride to the gas product of, thereby preparing a gas mixture containing a $SiHF_3$ and the hydrogen fluoride; and (e) bringing the gas mixture into contact with elemental nickel at a temperature of 400° C. or higher, thereby reacting the $SiHF_3$, with the hydrogen fluoride to produce silicon tetrafluoride.

9. A process according to claim 8, wherein step (a) is conducted in a piston flow manner, thereby producing the gas product that contains $SiHF_3$ as a by-product and is substantially free of hydrogen fluoride.

10. A process according to claim 8, wherein the hydrogen fluoride of step (d) is in an amount of not greater than 1 volume %.

* * * * *